United States Patent
McMahan

[15] 3,670,256
[45] *June 13, 1972

[54] LASER GUIDE CONSTRUCTION
[72] Inventor: William H. McMahan, Winter Park, Fla.
[73] Assignee: Control Laser-Orlando, Inc., Orlando, Fla.
[ * ] Notice: The portion of the term of this patent subsequent to Dec. 1, 1987, has been disclaimed.
[22] Filed: March 9, 1970
[21] Appl. No.: 17,461

Related U.S. Application Data
[62] Division of Ser. No. 655,652, July 24, 1967, Pat. No. 3,544,915.

[52] U.S. Cl. ..................................................... 331/94.5
[51] Int. Cl. ................................................... H01s 3/02
[58] Field of Search .......................................... 331/94.5

[56] References Cited
UNITED STATES PATENTS
3,544,915  12/1970  McMahan ........................... 331/94.5

Primary Examiner—William L. Sikes
Attorney—B. B. Olive

[57] ABSTRACT

A laser construction utilizes a gas which assumes an ionic state at the discharge temperature and in the active discharge region the plasma is contained and "guided" by a tube exhibiting anisotropic and semi-conductor properties, pyrolytic carbon being used as an example. The tube utilizes the thermal and electrical characteristics of the material such that radially of the axis of discharge the tube exhibits high thermal conductivity and axially of the discharge the tube exhibits low thermal conductivity and a semi-conductor electrical character. The tube is held at an anodic potential which enables employment of a unique starting technique and reduction of ionic bombardment between the plasma and the bore of the tube. Other electrical and physical configurations for reducing ion bombardment or "sputtering" are disclosed.

8 Claims, 8 Drawing Figures

INVENTOR.
William H. McMahan

ATTORNEY

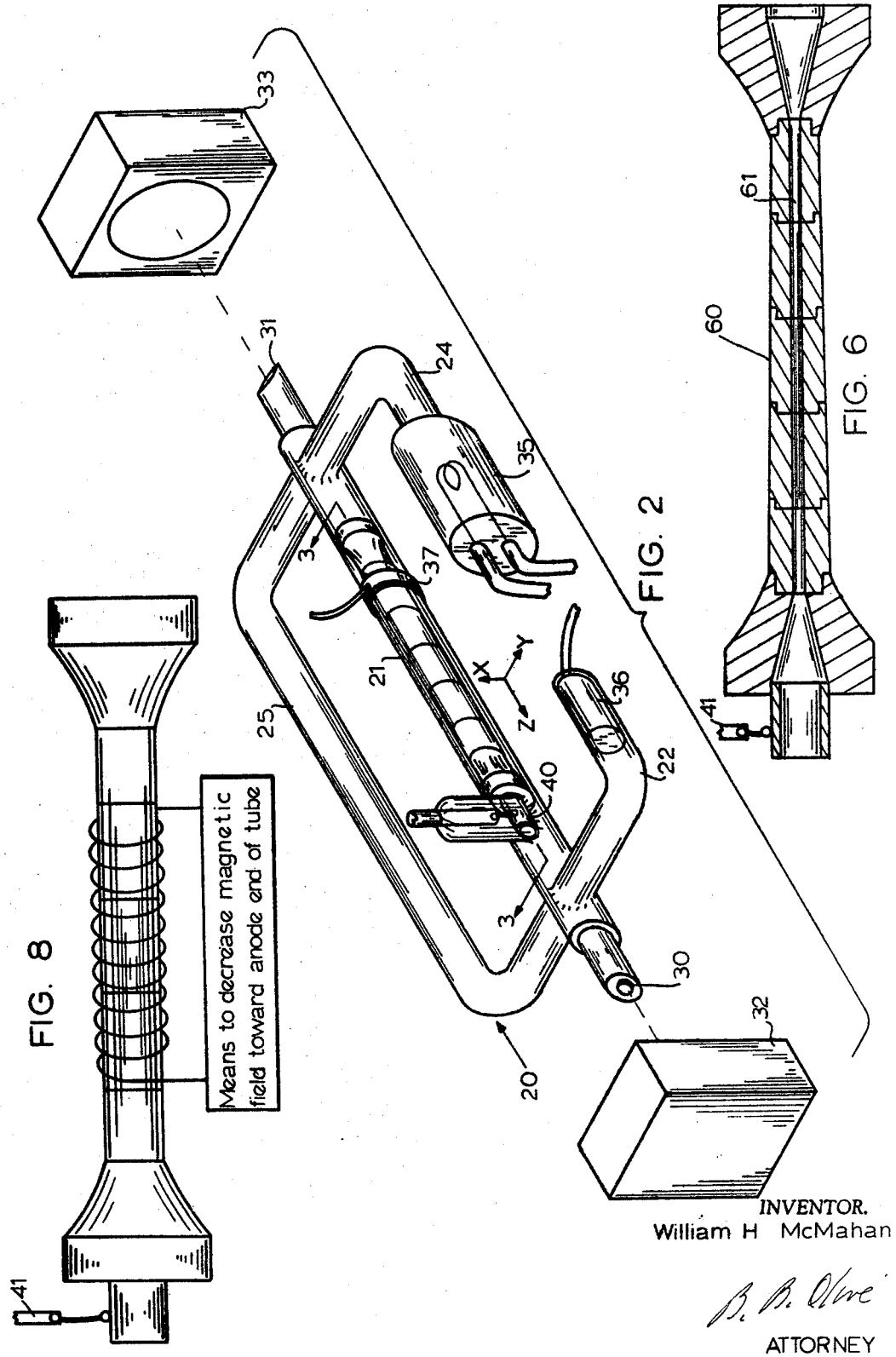

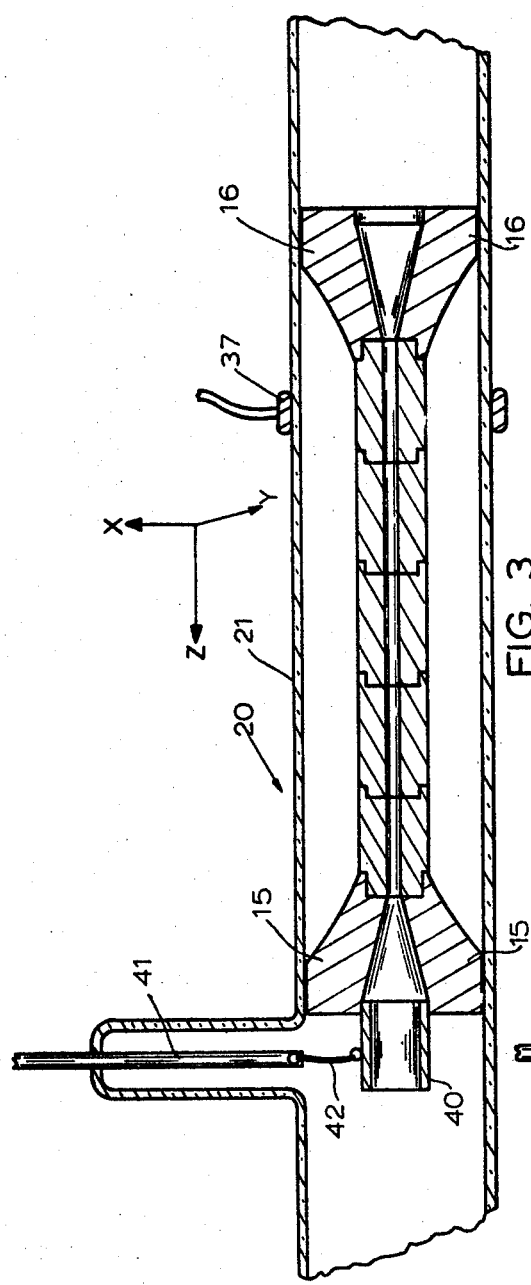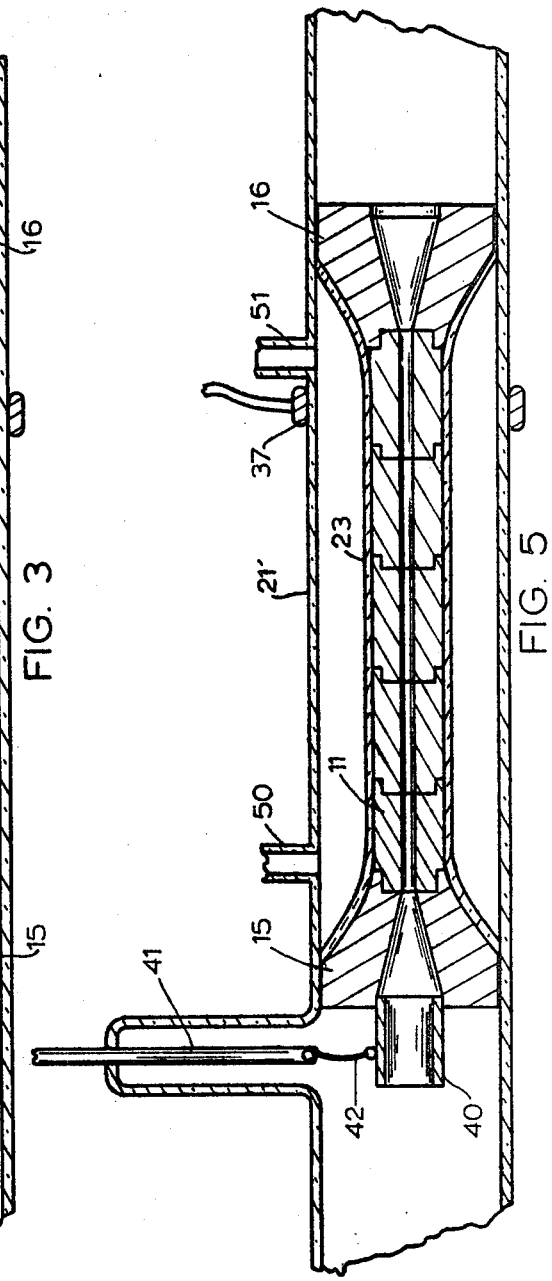

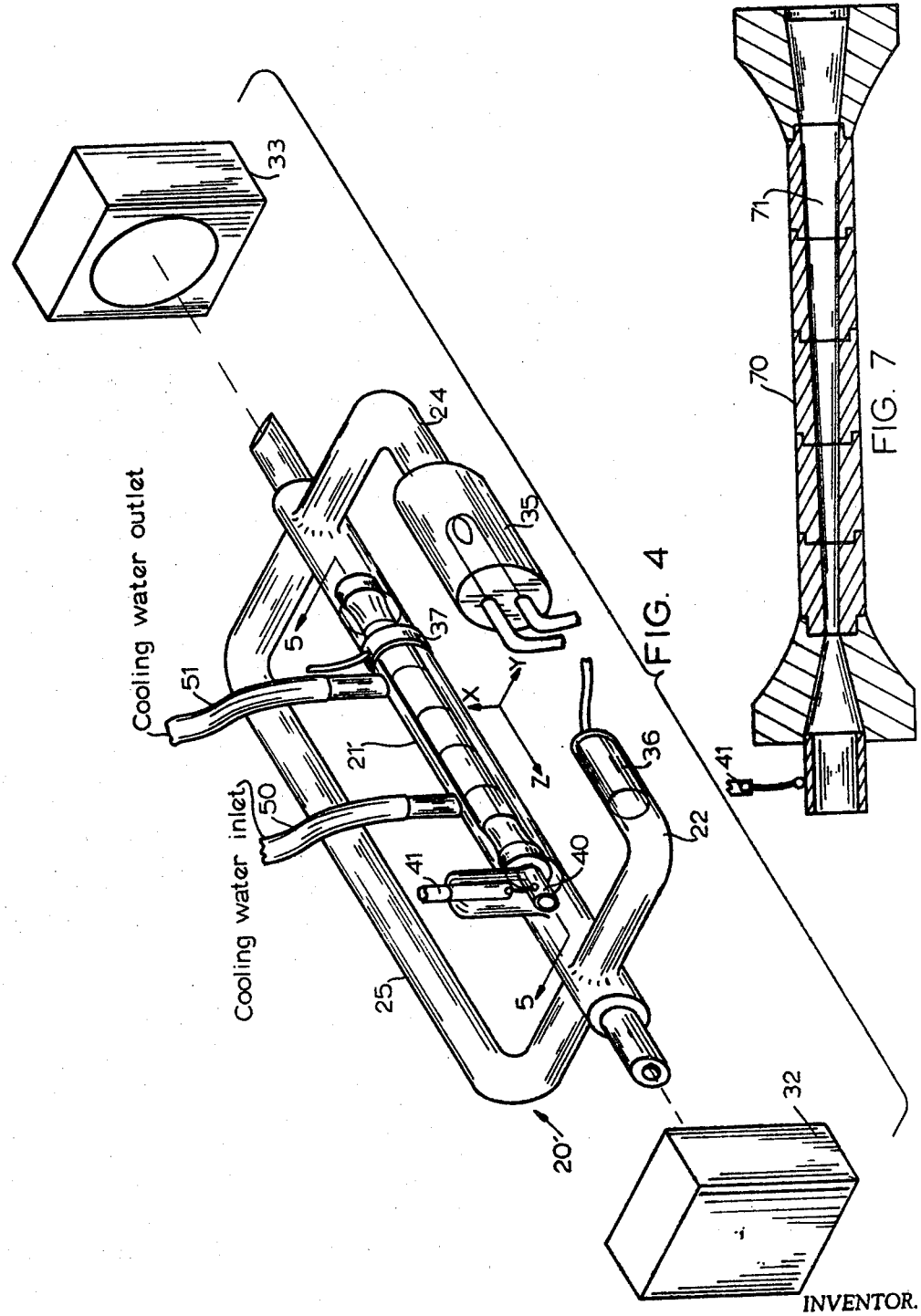

LASER GUIDE CONSTRUCTION

CROSS REFERENCE TO RELATED APPLICATION

This application is a division of copending application, Ser. No. 655,652, filed July 24, 1967, titled "Gas Laser Plasma Guide" now issued as U.S. Pat. No. 3,544,915.

BACKGROUND OF THE INVENTION

1. Field of the Invention

The invention relates broadly to devices for generating directional and coherent light beams and in current literature such devices are identified as "lasers." More specifically the invention is directed to what will be referred to as a laser and to the type of laser which utilizes a gas that assumes an ionic state at the discharge temperature. With respect to such a laser the invention is furthermore concerned with the physical construction of the laser and particularly with what is sometimes referred to as the laser "tube" which contains and guides the plasma during discharge and defines the region in which light generation is achieved. The invention when treated as an "oscillator" also may be said to be related to molecular or particle type resonators and to optical amplifiers.

2. Description of the Prior Art

Gas lasers are old, an example being the well known argon ion laser. It is also known to employ various conductor and insulator materials for the laser tube in the active region and among the most widely used of such prior art materials has been quartz. There has also been produced a gas laser in which in the active region there is employed what is effectively a slotted tubular configuration made up from pressed, porous, amorphous, annular graphite rings which are electrically out of contact with each other, are spaced from one another and which exhibit individually in the axial direction of the tube an electrical conductivity which is undesirably high. Various ceramic materials, insulated metal sections and tubes of insulator material have been used. In general, it can be said as to prior art materials which have been employed for laser tubes that such materials have either been insulated conductors or insulators and have exhibited undesirable characteristics both thermally and electrically and this has held back the development of the gas laser because of heat problems and electrical conductivity problems as well as ionic bombardment problems associated with starting and maintaining the laser beam. Laser guide materials have frequently been mounted on or supported by other materials for structural purposes and this has led to complex physical structures. The prior art has also been directed to amorphous materials, i.e., materials whose electrical and thermal characteristics are not oriented along any particular plane or axis. The life and power outputs obtained have been limited by the choice of materials employed in the laser tube and by the manner of operation.

In recent years the development of extremely high temperature problems in space craft and other advanced applications has led to the development of a new material referred to as "pyrolytic" graphite and such material has been used for the manufacture of fastening devices such as nuts, bolts and screws which have to withstand extremely high temperatures. Such material is obtainable from the Space Age Materials Corporation, 25–26 50th Street, Woodside Long Island, N. Y. 11377. This material is known to be of an anisotropic nature and when made in the form of a sheet, which is generally the only form in which it has been practical to manufacture, exhibits the unusual character of having extremely low electrical and thermal conductivity in the axial direction, i.e., the "Z axis," perpendicular to the plane of the sheet. Further, in the plane of the sheet, i.e., the basal plane, radially of the axis perpendicular to the plane of the sheet, the material exhibits a relatively high electrical and thermal conductivity. Primary interest in the material has focused on use in space craft, high temperature applications. The possibility of converting such sheet form to a tubular form suitable to laser application and to utilizing the thermal as well as the electrical properties of such material for a laser tube has not been previously recognized or pursued by those working in the laser art.

Prior art articles useful to an understanding of the invention and dealing with gas lasers, laser tube constructions, ionic bombardment, starting and operating techniques and with graphite product properties may be found in the following publications:

1. "Applied Physics Letters," Volume 4, Number 10, May 15, 1964, and Volume 7, Number 7, Oct. 1, 1965;
2. "IEEE Journal of Quantum Electronics," Volume QE-3, Number 2; February, 1967, and Volume QE-1, Number 6; September, 1965.
3. "Electrochemical Technology," issue of May–June, 1967.

An object of the present invention, therefore, is to utilize an anisotropic material for the construction of a laser tube.

Another object is that of utilizing the properties of pyrolytic graphite material specifically in the construction of a laser tube.

Another object is to provide a laser tube constructed of a material and in such an electrical and physical configuration that the entire tube can be started and operated with the tube itself acting as the anode.

Another object is that of providing a laser tube which in a direction radial of the axis of the tube, i.e., the basal plane, exhibits a high thermal conductivity for heat dissipated in the active region of the laser.

Another object is that of providing a method of constructing self-supporting, electrically and physically integral, tubular configurations from a sheet of an anisotropic material.

Another object is that of providing a gas laser incorporating a laser tube which exhibits a semi-conductor electrical property in the axial direction, i.e., the Z axis of the material, such that when the laser is in a laser mode and the tube is held at an anodic potential, the discharge is maintained in the gaseous path defined by the bore of the tube and in a manner to minimize the effect of ion bombardment within the bore.

The foregoing and other objects will become apparent as the description proceeds.

SUMMARY OF THE INVENTION

According to the invention a laser is provided which is generally of the ion and gas laser type and is generally adapted to utilize any gas which assumes an ionic state at the temperatures encountered during laser discharge, hydrogen being an exception. Within the active discharge region, the gas is confined in a tube formed of an anisotropic material. The tube exhibits a semi-conductor electrical character in the axial or Z axis direction and relatively high thermal conductivity in the basal plane, i.e., in a direction radial to the axis of the tube, both of which characteristics are utilized by the invention and particularly in this axial and radial orientation. In the embodiment of the invention disclosed, the anisotropic tube is made up of uniform cylinders which are individually formed from a sheet of anisotropic material, namely, pyrolytic graphite and which are assembled together in a self-supporting tubular form and which operates as if it were molded as an integral structure both electrically and physically. The cylinders are cut from the sheet with an anisotropic orientation related to the anisotropic orientation of the sheet such that the tube exhibits the desired radial thermal conductivity and axial electrical semi-conductivity and such method of achieving such an anisotropic tube forms part of the invention.

The laser of the invention may be either of the air cooled or water cooled type, both being hereinafter discussed, and in addition to being directed to a laser tube constructed of anisotropic material and to the method of making such a tube from anisotropic material in sheet form, the invention is further directed to the mode of sustaining the plasma discharge in a semi-conductor laser tube such that ion bombardment is minimized or eliminated entirely and the life of the tube is thereby considerably lengthened. In regard to this aspect of the invention, the invention relies on employment of a potential on the anode end of the tube after discharge has been obtained and the laser is in a laser mode such that the tube potential, at its anode end, is held at an anodic potential equal to or positive with respect to the potential of the plasma at the anode end and the potential on the cathode end of the tube is held equal, i.e., neutral or positive, with respect to the plasma potential at the cathode end such that the normal tendency of the gas ions to leave the gas and impinge on the inside surface of the bore of the tube is prevented. Other means for reducing ion bombardment are disclosed and are directed to modifying the shape of the tube or altering the magnetic field in the active region.

Generally, the invention can be said to be directed to the method of making of a self-supporting anisotropic, semi-conductor, laser tube, to the embodying of such a tube in a gas laser and to the circuit arrangement employed to initiate and maintain the plasma discharge in the tube once it has been started in a manner to prevent or minimize tube deterioration due to ion bombardment.

DESCRIPTION OF THE DRAWINGS

FIG. 2 is a perspective of a laser system based on air cooled operation and utilizing a laser tube according to the invention;

FIG. 3 is a section view taken generally along line 3—3 of FIG. 2;

FIG. 4 is a perspective view of a laser system based on water cooled operation and utilizing a laser tube according to the invention;

FIG. 5 is a section view taken generally along line 5—5 of FIG. 4;

FIG. 6 is a longitudinal section view of a tube construction modified to equalize the potential drop along the plasma and tube;

FIG. 7 is a longitudinal section view of a tube construction illustrating an alternate modified tube for equalizing the potential drop along the plasma and tube; and FIG. 8 represents schematically an arrangement for equalizing tube and plasma potentials by adjusting the magnetic field.

DESCRIPTION OF THE PREFERRED EMBODIMENTS

Figure 1:
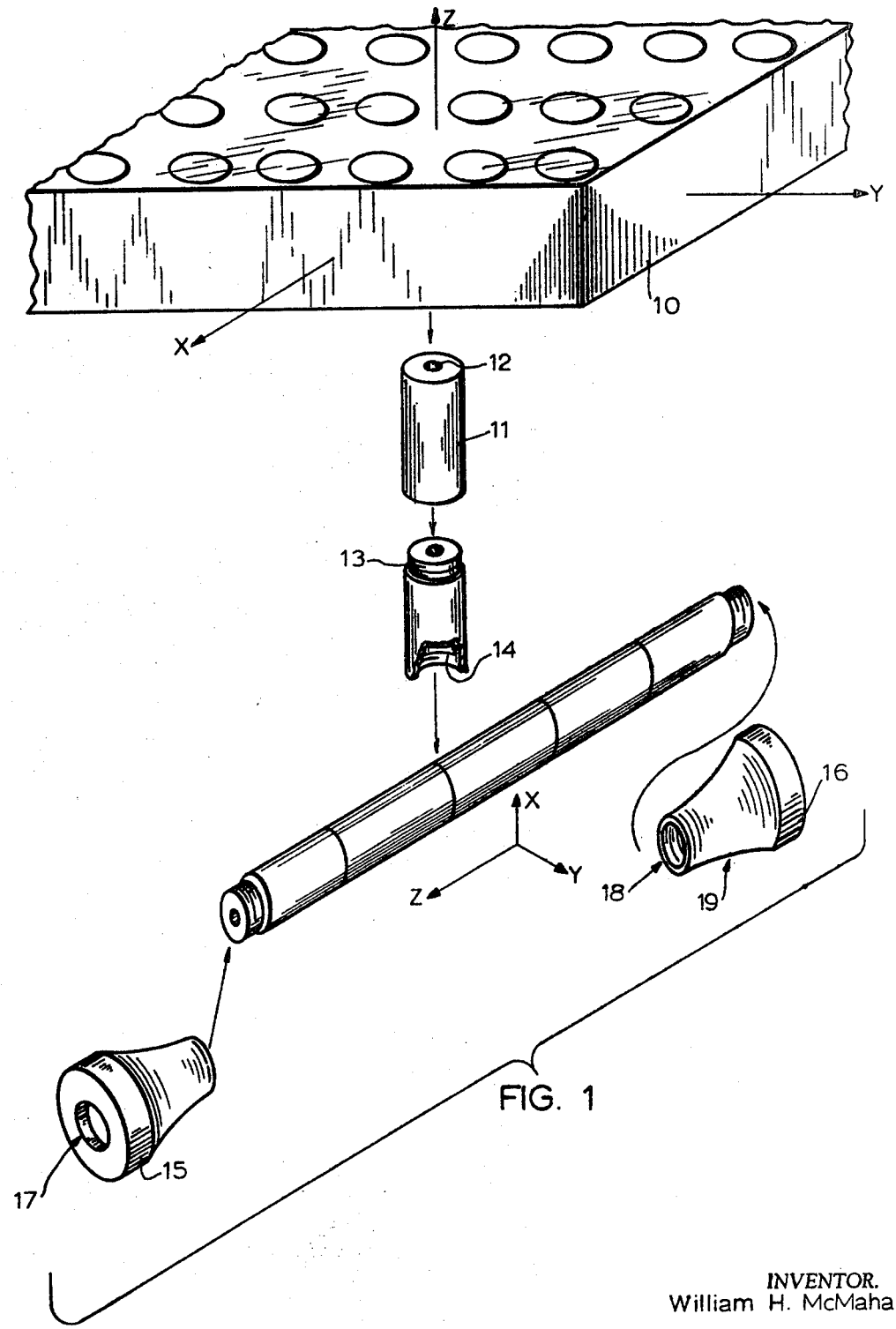
FIG. 1 is a perspective flow diagram illustrating the manner of obtaining an anisotropic tube from a sheet of anisotropic material.

As has heretofore been mentioned much of the invention is directed to the employment of a laser tube formed of an anisotropic material. While it is believed that many materials will eventually prove to have a suitable semi-conductor electrical character to enjoy certain aspects of the invention particularly those aspects related to ion bombardment reduction, a material known to be peculiarly adapted to the invention is the previously identified pyrolytic graphite. This material is presently known to be available only in sheet form as represented by sheet 10 of FIG. 1 and in this form the sheet exhibits relatively high electrical resistance and low thermal conductivity in an axial direction perpendicular to the plane of the sheet as indicated by the axis Z in FIG. 1. In the plane of the sheet, X-Y, i.e., the basal plane, perpendicular to and radially of axis Z the material exhibits the character of having relatively high thermal conductivity and low electrical resistance though the latter characteristic is not of particular significance to the present invention.

Properties of a typical grade of pyrolytic carbon suited to the invention are as follows:

| | at 1000°C. | at 30°C. |
| --- | --- | --- |
| "X-Y" Thermal Conductivity | 2 Joule cm/cm² sec °C | same |
| "Z" Thermal Conductivity | .02 Joule cm/cm² sec °C | same |
| "X-Y" Electrical Conductivity | $225 \times 10^{-6}$ ohm cm | $400 \times 10^{-6}$ ohm cm |
| "Z" Electrical | .35 ohm cm | .6 ohm cm |

In order to achieve a self-supporting tube with the desired anisotropic orientation, a plurality of cylinders 11 of the material are cut out of the sheet 10 and cylinders 11 are each individually provided with a precision bore 12 which in assembly, provides the desired optical aperture. At opposite ends of each cylinder suitable male threads 13 and female threads 14 are provided and which enable the cylinders 11 to be assembled into a self-supporting tubular form with solid electrical contact as if the form had been made into an integral structure both electrically and physically. The basic tube assembly is completed by the addition of the mounting pieces 15, 16 which as indicated are provided with mating bores 17, 18 and are preferably tapered as indicated at 19 to facilitate and confine the heat flow during laser operation. While mounting pieces 15, 16 might be formed of a material such as pressed graphite or a suitable metal, it is preferable that the same anisotropic material, namely, the pyrolytic graphite, be employed.

It may be noted that while screw connections are indicated as a means of joining cylinders 11 and mounting pieces 15, 16 other means such as a suitable carbon glue might be employed. However, any securing means employed should provide a solid, continuous, electrical contact between the cylinders 11 and should adapt to the extremely high temperatures encountered and not lead to differential expansion problems. Further, the tube in use should preferably be self-supporting and maintain the accurate alignment of the axial bore of the tube. Of particular interest to the present invention is the fact that the method of manufacture illustrated by FIG. 1 allows a self-supporting anisotropic tube having high radial heat conductivity and an axial semi-conductor electrical character to be obtained from sheet material whose conversion to the desired tubular form and anisotropic orientation is otherwise not readily apparent. While the self-supporting feature is desirable it will be understood that certain embodiments such as the water-cooled embodiment next described may lend themselves to utilizing external or other support means for the tube.

Reference is next made to FIGS. 2 and 3 which illustrate a simplified somewhat schematic air cooled laser system embodying the invention and in which only those components necessary to an understanding of the invention are illustrated. For example, the details of the power supplies, solenoid, mirrors, mirror adjustments and the like are not shown since the same may be conventional and are well known to those skilled in the art. Further, it will be apparent that the discharge in a gas laser of the type found in the invention may be initiated in various ways such as by a Tesla coil and while the invention in one aspect is concerned with the manner in which the discharge is initiated and then sustained once it has been initiated, no attempt is made in the drawings or description to deal with any specific auxiliary circuitry for initiating the discharge such as would normally be required in the laser embodiments illustrated in the drawings.

Again referring more specifically to FIGS. 2 and 3, a suitable gas housing 20 is formed of a suitable glass material such as quartz, Pyrex or the like so as to provide an enclosure generally indicated at 21 for enclosing the active discharge region, an anode region enclosure 22, a cathode region enclosure 24 and the usual gas return path enclosure 25. Brewster windows 30, 31 are mounted in the usual manner and along the same axis are mounted the required adjustable reflecting mirror assemblies generally indicated at 32, 33. The cathode 35 and the primary anode 36 may be of conventional construction and are connected to suitable power supplies not shown. While shown in a location remote from the tube, it should be understood that the anode 36 and cathode 35 could be located in other positions known to the art. As later explained it should also be understood that in one operating mode the necessity for anode 36 is eliminated. Starting or initiation of the discharge may be effected in various ways as previously stated and to enhance the laser action there is shown the usual magnetic coil 37 which should be understood to be mounted so as to surround the enclosure portion 21 constituting the active region.

Referring to FIG. 3 the tube assembly composed of the assembled cylinders 11 and the mounting pieces 15, 16 is shown mounted in the enclosure 21 forming part of the gas housing 21. Mounting pieces 15, 16 are preferably snugly fitted and it will be noted that an electrically conducting cylinder 40 is mounted in the end of mounting piece 15. Cylinder 40 is preferably formed of a refractory, electrically conductive material, such as tantalum, and is press-fitted into mounting piece 15 to provide a means for electrically connecting a secondary anode 41 through connecting wire 42 to the mounting piece 15. The utilization of secondary anode 41 is discussed later and it may be noted that secondary anode 41 is assumed to be connected to a suitable power supply not shown but the character of which will be indicated by the description to follow. It should also be noted that the gas housing 20 is filled with a suitable gas of a type which will assume an ionic state at the discharge temperature. Gases suited to the invention include argon, krypton and xenon though this list is given merely by way of example and not by way of limitation.

Prior to dealing with any particular mode of operating procedure reference will be made to FIGS. 4 and 5 which represent a laser system comparable to the system of FIGS. 2 and 3 except that the system of FIGS. 4 and 5 is designed for water-cooled rather than air-cooled operation. To the extent that the two systems use the same components like numerals designating the parts have been used. In particular, it will be noted that the water-cooled system uses an enclosure designated by 21' and forming part of a gas housing 20' which includes an inlet 50 and an outlet 51 for connection to a suitable source of cooling water not shown. The tube itself is enclosed in a further housing 23 which surrounds the tube and the mounting pieces 15, 16. Housing 23 is sealed to housing 21' or provided with gaskets to contain the cooling liquid. Both housing 21' and housing 23 may be formed of quartz and suitably sealed. The volume of flow and the inlet and outlet temperatures will of course vary with the application but generally it may be stated that cooling water at normal tap temperature can be adapted to cool laser systems of the powers envisioned within the scope of the invention.

A typical starting procedure and mode of laser operation will next be described. The gas housing is first pumped down to within the range of $10^{-7}$ millimeters mercury pressure of air and is filled with a suitable gas such as argon at approximately one-half millimeter pressure. The magnetic solenoid 37 is energized to produce a magnetic field strength in the tube in the range of 500 gauss and which acts to enhance the laser action as known to the art. A suitable potential which may, for example, be 500 volts D.C. is applied between the cathode 35 and the secondary anode 41. Since the tube of the invention is a "conductor" it acts to shield any attempt to fire the gas in the tube itself. At this stage it is therefore necessary to break the gas down to create a starting discharge between the cathode 35 and the cathode end of the tube and one means of doing this is to excite the gas by use of an auxiliary Tesla coil or by means of a pulse of suitable intensity such that a low starting current arc is created between the cathode and the end of the laser tube adjacent the cathode. Next, it is necessary to increase the voltage or current by any suitable means such that the discharge will be caused to move along the laser tube towards the anode end of the tube and so as to terminate on the secondary anode 41. In this mode the discharge will follow the gaseous path within and defined by the laser tube. That the discharge will follow this mode of operation can be explained by the fact that the voltage drop per unit length of discharge in the gas moving from the cathode to the anode end of the tube will be lower than the voltage drop per the same unit lengths of laser tube. Expressed in terms of electrical impedance it can be said the plasma offers a lower impedance. With the discharge extending between the cathode 35 and the secondary anode 41, the laser can be said to be in an operating laser mode.

To achieve an alternate operating mode, the operating procedure is to transfer the discharge from the secondary anode 41 to the primary anode 36 and this is accomplished by applying a suitable voltage to the primary anode 36 to effect the transfer and by using suitable external means to break down the gas and establish a discharge between the anode 36 and the anode end of the tube. However, it is important to note that in this alternate mode when making this final transfer enough voltage is left on the secondary anode 41 to maintain a uniform potential gradient along the length of the laser tube the reason for this being later explained. It may also again be noted that transfer to the primary anode 36 is optional and represents an alternate mode of operation to the extent that an operating laser mode may be maintained by utilizing the secondary anode 41 and the tube itself as the only source of anode potential during laser operation.

The anisotropic and semi-conductor character of the laser tube construction offers a number of advantages. From a thermal viewpoint, it becomes possible to mount such a laser tube in materials and forms of mountings which do not require adaptability to extremely high temperatures since the very character of the laser tube of the invention substantially eliminates the usual extremely high level axial heat conduction. That is, whatever means are used to grip the ends of the tube remain essentially cool because of the nominal axial heat conduction. Furthermore, because of the excellent radial heat conducting properties the heat which is primarily developed in the active discharge region can be dissipated radially and confined to that region. Cooling fluids, heat conducting fins and the like can thus be concentrated in the area around the active discharge region which offers a material advantage from the viewpoint of engineering the heat transfer aspects of any particular laser system. The overall thermal advantages thus reduce thermal heating and the usual deterioration of the laser bore due to thermal heating.

A further advantage of the invention is that the semi-conductor electrical properties of the laser tube of the invention offer advantages in the nature of the starting and operating techniques which may be employed. A particular advantage of a semi-conductor material such as pyrolytic graphite is its ability to adapt to laser discharge without the usual deterioration of the laser bore caused by ion bombardment. That is, the laser tube of the invention offers a reduction in deterioration of the laser bore both because of a reduction of the thermal heating problem as well as a reduction of the ion bombardment problem. With regard to the latter, ion bombardment is known to be destructive because of the high mass of the ions. Electrons, on the other hand, when impinging on a laser tube material with the same energy as ions will not effect comparable damage. Considering a laser tube bore as a "discharge wall," it can be said that ion bombardment is caused by the discharge wall having a potential more negative than that of the adjacent plasma column. The use of dielectric materials in laser tubes causes such a negative potential from an electron buildup on the discharge wall. Furthermore, where the laser tube comprises a series of conducting discs, the referred to stacked graphite carbon disc laser tube being an example, a damaging negative potential of the kind referred to is produced since each disc adjusts to the average potential of the plasma column at the point of contact to the disc. Thus, the anode side of each such disc is more negative than the plasma and ion bombardment is induced.

According to the invention, an electrical semi-conductor such as the mentioned pyrolytic graphite material is employed and in a physical and electrical configuration which allows the potential of the discharge wall to be maintained at the same potential as the plasma column at each point of contact. This is accomplished in the invention by placing the potential on the secondary anode 41 at or near the operating potential of the primary anode 36. With this arrangement, the electron current from the plasma to the discharge wall maintains all points of the discharge wall at or near the same potential or positive with respect to the potential of the column at the point of contact to the plasma. Furthermore, the discharge current itself is maintained primarily in the gaseous path and not in the tube material since the plasma column as an electrical path forms a path of lower resistance than does the electrical path provided by the material forming the laser tube itself.

While the laser tube construction shown in the preferred embodiment is essentially a cylindrical tube it should be noted that other physical constructions are encompassed within the scope of the invention. It is recognized, however, that whether the tube is made in a true tubular, columnar or other geometrical form it must provide an "optical aperture" and it must be of such form as to act as a "guide" for the plasma column in the sense heretofore explained. Within these boundary conditions, however, it can be seen that laser tube forms other than the simple cylindrical, tubular form described may utilize the teachings of the invention and this will next be discussed.

It has already been mentioned that the laser of the invention leads to a reduction in ionic bombardment and thus to an increase in laser tube life. FIGS. 6, 7 and 8 deal with alternate forms of the invention in respect to equalizing the tube and plasma potential gradients for this purpose. To supplement the prior discussion of ion bombardment, it can be shown that the drop through the plasma is non-uniform when in a uniform cross-section bore, when under the influence of a uniform field and when in a laser mode, i.e., the voltage drop per unit length under these conditions will be different from unit to unit along the tube length. However, the potential, whatever its value, at the anode end of the tube will tend to be the same in both the gas and tube. Furthermore, it can be said that the potential at the cathode end of the tube, whatever its particular value, will tend to be equal in both the gas and tube. The tube of the invention, unlike the gas, when made of uniform cross section does exhibit a uniform drop per unit length. Therefore, at a particular point along the bore, the tube may tend to go negative with respect to the gas at the same point and induce ion bombardment at that point. To further reduce the possibility of ion bombardment at any point of contact between the tube bore and the gas in the discharge region the invention contemplates in alternate embodiments the employment of either electrical or physical configurations as illustrated in FIGS. 6, 7 and 8 to compensate for any tendency of the tube to go negative with respect to the gas. The tube of the invention because of its unique character of being essentially an integral "conductor" and at anodic potential is uniquely suited to these embodiments.

At least three practical means are available for the desired potential gradient compensation. These include the concept of increasing the tube material cross section in the anode direction as illustrated by the modified tube 60 and in which the bore 61 is of uniform diameter. It will, of course, be understood that FIG. 6 is not intended to be drawn to scale and that any specific tube would have its particular cross-section gradient adjusted to the electrical potential gradient required by the particular gas and other parameters of the system such that the walls of the bore 61 at all points remain positive or neutral with respect to the gas.

Another means for achieving potential gradient adjustment is illustrated by FIG. 7 in which the modified tube 70 is provided with a bore 71 which tapers toward the anode end so as to reduce the discharge path in the anode direction and thereby achieve the desired potential gradient in the gas.

A further electrical means is schematically illustrated by FIG. 8 in which the laser system includes means 80 for decreasing the solenoid magnetic field in the anode direction and which acts to increase the potential drop per unit length in the plasma. That is, it is known that potential drop in the plasma is directly related to the magnetic field produced by the solenoid and thus by decreasing the magnetic field in appropriate amounts in the anode direction the magnetic field itself can be used as a means for establishing the desired potential gradient and controlling ion bombardment. While not shown in detail it will be understood to those skilled in the art that suitable means for decreasing the field could, for example, be inherent in the solenoid design or could be provided by compensating windings productive of controlled opposing field conditions.

It is also contemplated that other semi-conductor materials having a resistance in the semi-conductor range of $10^{-3}$ to $10^6$ ohm centimeters at the laser operating temperature will be found useful in the anti-ionic bombardment and potential arrangement taught by the invention and irrespective of whether such materials exhibit the same anisotropic character as does the pyrolytic graphite material used as an example in the embodiment herein disclosed.

Having described the invention, what is claimed is:

1. A laser plasma guide comprising an elongated material having a bore therethrough for forming an optical path and a plasma containing wall, said material being a semi-conductor in the direction of elongation at the operating temperature of said plasma and providing an electrical contact over the total length of said bore.

2. A guide as claimed in claim 1 wherein said material is anisotropic and is highly thermally conductive in the direction radially of said material direction of elongation.

3. A guide as claimed in claim 2 wherein said material is pyrolytic carbon.

4. A guide as claimed in claim 1 wherein at the operating temperature in the active region of said guide the resistance of said material is in the range of $10^{-3}$ to $10^6$ ohm centimeters.

5. A guide as claimed in claim 3 wherein said guide in the active region is formed as a substantially cylindrical tube.

6. A guide as claimed in claim 3 wherein said tube is formed of individually secured cylinders in which said bore is a common axial bore of said cylinders arranged to provide said aperture and collectively form said guide.

7. A guide as claimed in claim 1 wherein said bore is tapered inwardly toward one end of said guide and in relation to a selected potential gradient established within said bore.

8. A guide as claimed in claim 1 wherein the diameter of said bore is uniform and the cross section of said guide increases toward one end of said guide and in relation to a selected potential gradient established within said bore.

* * * * *